United States Patent [19]
Lindner et al.

[11] 3,970,033
[45] July 20, 1976

[54] PORTABLE REFLECTOR DEVICE

[75] Inventors: Henry Lindner, Woodale; James D. Kennedy, Streamwood, both of Ill.

[73] Assignee: Beatrice Foods Company, Elgin, Ill.

[22] Filed: Feb. 4, 1974

[21] Appl. No.: 439,045

Related U.S. Application Data

[63] Continuation-in-part of Ser. No. 351,308, April 16, 1973, abandoned.

[52] U.S. Cl. ............................ 116/63 P; 40/125 H; 40/156; 350/103
[51] Int. Cl.² ...................... E01F 9/10; G09F 1/10
[58] Field of Search ............... 40/125 J, 125 H, 152, 40/10, 125 R, 125 N; 116/63 R, 63 P, 130 B; 350/97, 102–103, 107, 109; 52/398, 308, 475, 619, 620; 220/4 E, 80

[56] References Cited
UNITED STATES PATENTS

| | | | |
|---|---|---|---|
| 2,079,635 | 5/1937 | Sharp | 220/80 X |
| 2,369,381 | 2/1945 | Unke | 220/80 |
| 2,796,959 | 6/1957 | Toney | 52/619 |
| 3,251,460 | 5/1966 | Edmonds | 220/4 E X |
| 3,373,538 | 3/1968 | Prager | 52/619 X |
| 3,447,711 | 6/1969 | Bozek | 220/4 E |
| 3,593,681 | 7/1971 | Semoritz | 116/63 P |
| 3,600,059 | 8/1971 | Evans | 350/97 |
| 3,742,897 | 7/1973 | Meek et al. | 116/63 P |
| 3,750,333 | 8/1973 | Vance | 52/620 |
| 3,759,214 | 9/1973 | Evans | 116/63 P |
| 3,766,881 | 10/1973 | Ward | 116/63 P |
| 3,773,012 | 11/1973 | Linder et al. | 116/63 P |
| 3,811,214 | 5/1974 | Tate | 40/152 |

*Primary Examiner*—Richard C. Queisser
*Assistant Examiner*—Daniel M. Yasich
*Attorney, Agent, or Firm*—Hill, Gross, Simpson, Van Santen, Steadman, Chiara & Simpson

[57] ABSTRACT

A construction suitable for incorporation into a display device, reflector, or the like. The construction employs a closed loop of material having elongated side wall portions. The loop is generally cross sectionally H-shaped. A flange or the like may project laterally outwardly from one side wall portion of the loop. A pair of plates are provided, each plate having a groove formed about the perimeter of the inner surface thereof and being adapted to nest matingly in a different lateral opposed side face defined by the loop. The plates are directly interconnected together when rested in the loop and interlock over the inside legs of the loop.

15 Claims, 20 Drawing Figures

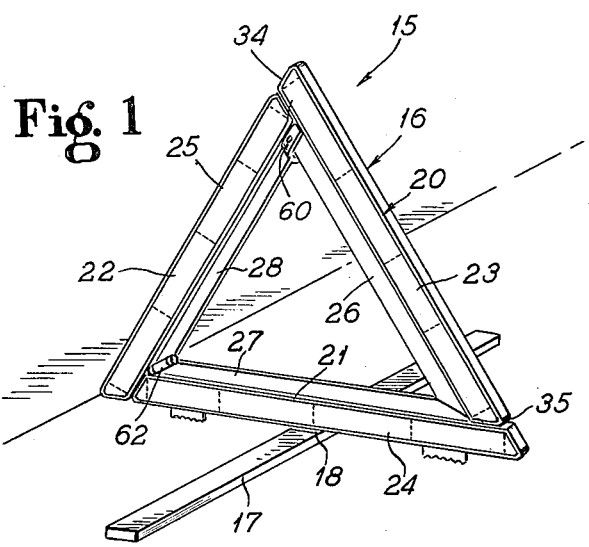
Fig. 1
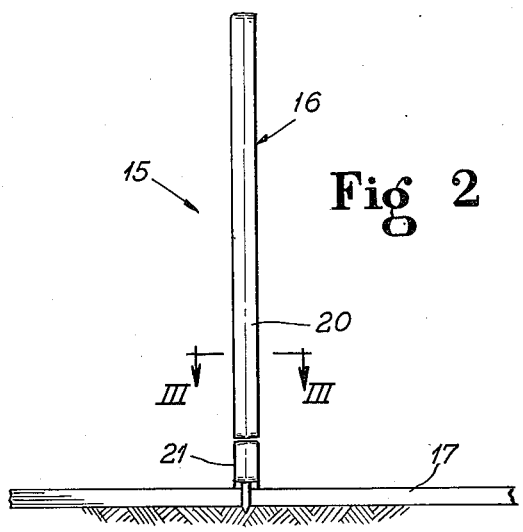
Fig. 2
Fig. 3
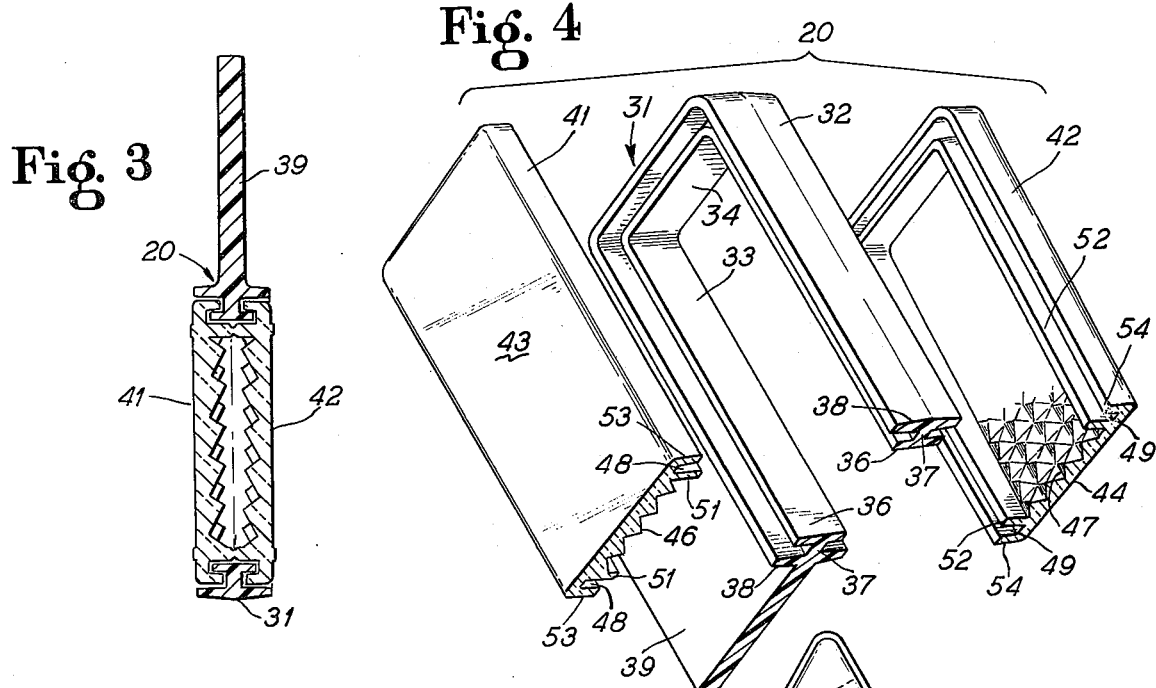
Fig. 4
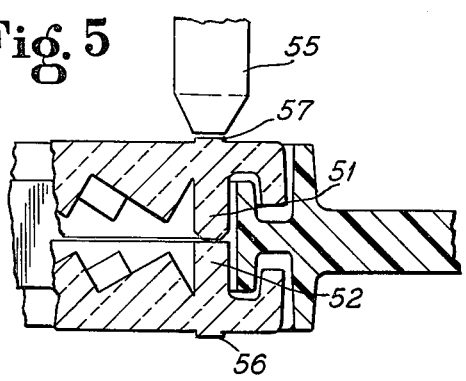
Fig. 5
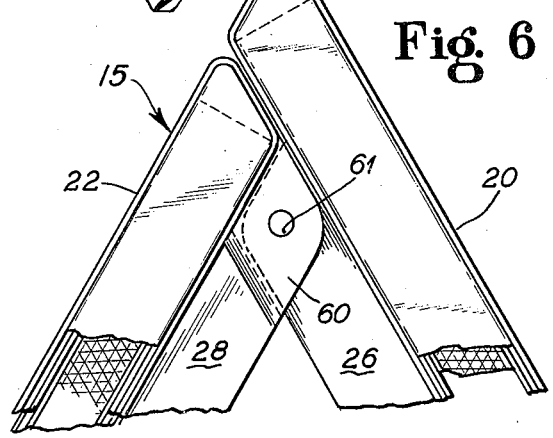
Fig. 6

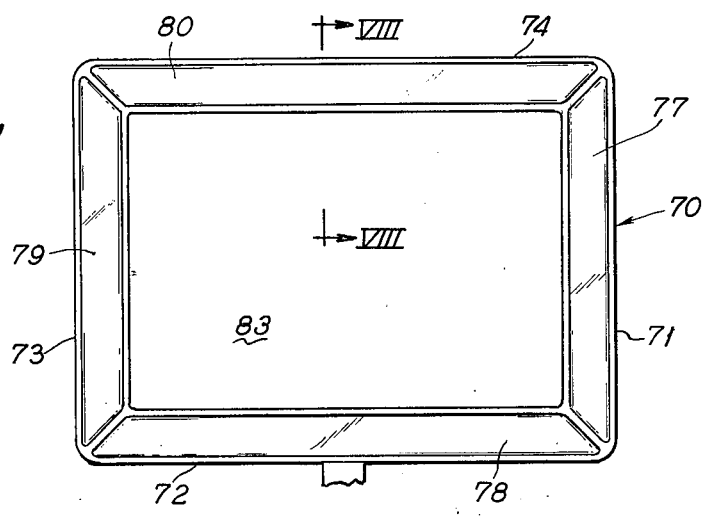
Fig. 7
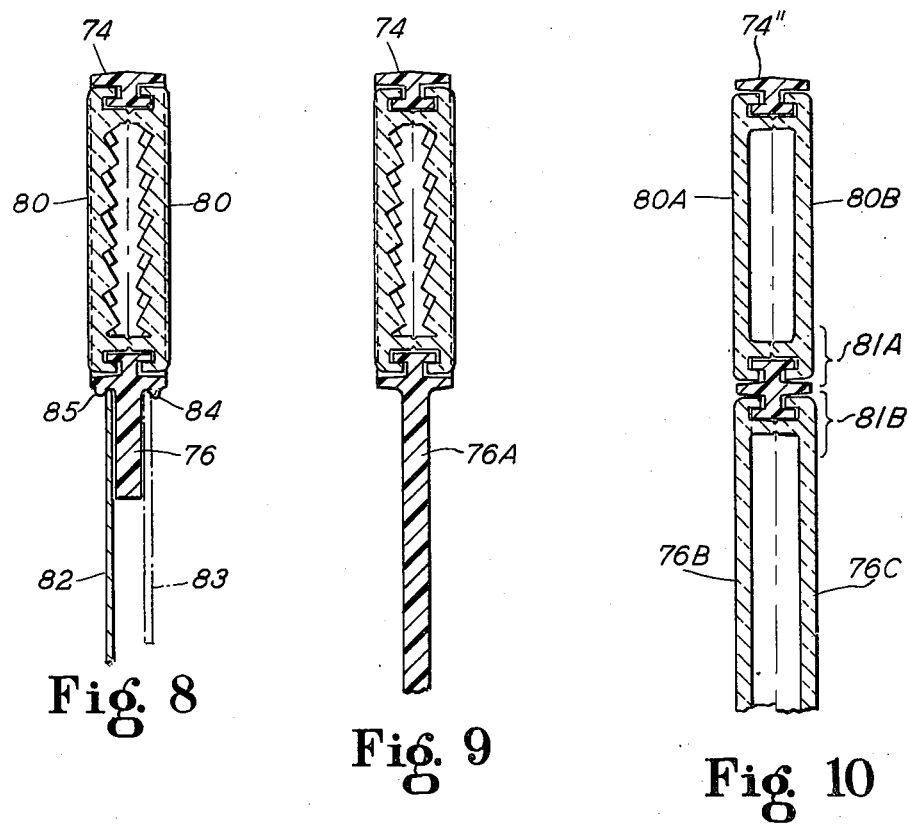
Fig. 8
Fig. 9
Fig. 10

PORTABLE REFLECTOR DEVICE

RELATED APPLICATION

This application is a continuation in part of our earlier filed application, Ser. No. 351,308, filed Apr. 16, 1973, now abandoned.

BACKGROUND OF THE INVENTION

In the manufacture of display devices, warning devices, reflectors and the like it has become popular to utilize in a single such device more than a single element, and, in particular, it has become common to employ two or more different types of plastic materials in combination to form such a device, owing not only to the manufacturing economies associated with the use of plastic materials, but also to the superior effectiveness and use properties of the resulting devices made therewith.

When utilizing such plastic materials to manufacture such a device, it is usual first to form the separate elements or subassemblies, as by molding, extruding, or the like. Then, thereafter, such formed elements are assembled into the desired display or other device. Such an assembly procedure can involve such an appreciable amount of labor that a product device has an excessive cost associated with its manufacture, as many manufacturers have found to their detriment. It is therefore of basic importance in the manufacture of plastic display devices utilizing two or more different plastic elements in respective performed configurations to so construct such individual elements as to minimize the subsequent labor required to complete assembly of the final product device.

One particularly common construction utilized in a variety of display and warning devices incorporates a reflective border member which circumscribes an interior area. Sometimes the entire interior area is itself a place for display of information; other times, such interior area is left open except perhaps in areas adjacent the border member. Contemporary construction practice involves the use of reflex reflector panels as such border members; such panels are separately formed or molded of a polymer, such as an acrylic resin, or the like. These reflectorized panels are then mounted into a pre-formed border frame member or members, formed of a vinyl polymer, or the like, in a subsequent assembly operation.

Another common construction used in display and warning devices incorporates an interior area comprised of a reflective member and a border circumscribing such member. This construction is similarly fabricated.

It is typical that such a product device is costly owing to the large number of assembly steps and time-consuming operations utilized in such assembly operation. Furthermore, it is very common to find that the product device is not as ruggged as desired and may be easily damaged or injured in normal use environments, so that the product device has a short life.

The art is continuously seeking new and better techniques for fabricating such devices in a more efficient and economical manner, and so as to have improved rigidity and stability over a wide variety of use conditions.

BRIEF SUMMARY OF THE INVENTION

The present invention is concerned with a construction which is adapted for incorporation into a display device or the like and which can, and is intended to, provide structural improvements over the known prior art constructions adapted for similar uses.

Specifically, the present invention provides a simple, effective and economical means for fabricating devices suitable for use in display or warding functions. A construction utilizing the principles of the present invention can be rapidly assembled from preformed plastic components and the product construction is adapted to display great rigidity and stability over a wide variety of use and environmental conditions.

The present invention is particularly useful in the manufacture of triangular warning devices of the type adapted to prevent rear end collisions between oncoming traffic and disabled vehicles.

The present invention is also adapted to the manufacture of four and other multi-cornered display devices, particularly those having a reflective border or a fluorescent border.

The present invention is further adapted for use in reflectors, particularly those having opposed reflective areas positioned in a back to back arrangement within a border member.

Other and further objects and utilities will be apparent to those skilled in the art from a reading of the present specification taken together with the drawings,

BRIEF DESCRIPTION OF THE DRAWINGS

In the drawings:

FIG. 1 shows a perspective view of a warning device incorporating one embodiment of a construction of the present invention;

FIG. 2 is a view in side elevation of the device shown in FIG. 1;

FIG. 3 is a vertical sectional view taken at the line III—III in FIG. 2;

FIG. 4 is an exploded view through an end region of a leg portion utilized in the device of FIG. 1;

FIG. 5 is an enlarged, detailed view of a portion of the structure shown in FIG. 3 and illustrating a sonic welding operation wherein a pair of reflector plates are secured together;

FIG. 6 is an enlarged, detailed view in front elevation of the apex region of the device of FIG. 1;

FIG. 7 is a plan view of a quadrilateral or four sided display device incorporating one embodiment of a construction of the present invention;

FIG. 8 is a vertical sectional view taken along the line VIII—VIII of FIG. 7;

FIG. 9 is a view similar to FIG. 8, but showing an alternative embodiment of a construction of FIG. 7;

FIG. 10 is a view similar to FIG. 8, but showing a further alternative embodiment of a construction of FIG. 7;

FIG. 12, part B is a view similar to FIG. 12 but showing an alternative form thereof;

DETAILED DESCRIPTION

Figure 11:
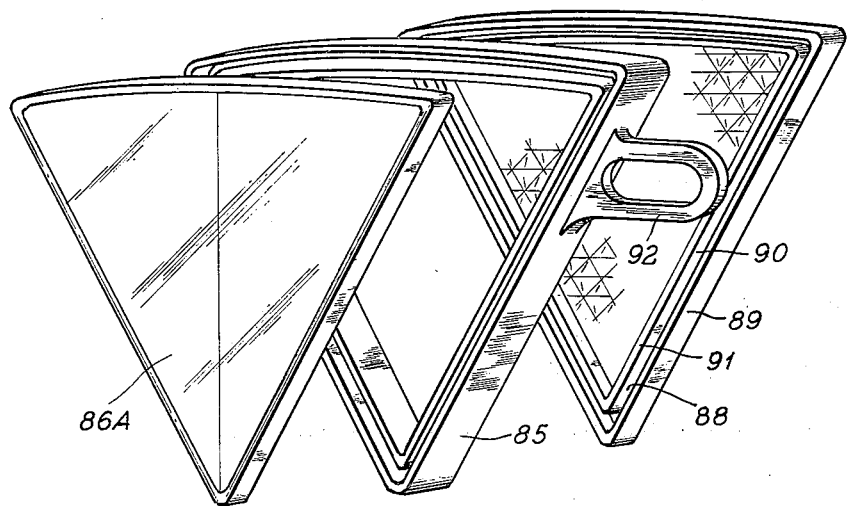
FIG. 11 is an exploded view in perspective of a warning device incorpoating incorporating embodiment of a construction of the present invention.

Turning to FIGS. 1 and 2, there is seen a warning device incorporating a construction of the present invention, such device being designated in its entirety by the numeral 15. Device 15 is seen to comprise a triangular assembly which is designated in its entirety by the numeral 16, a pedestal 17, and a pivot means 18. Device 15 is shown in an assembled configuration wherein the triangular assembly 16 is mounted on pedestal or bar 17, but is pivoted on a pivot means 18 to extend normally to pedestal 17.

Triangular assembly 16 is seen to incorporate three leg members, herein each designated in its entirety by their respective numerals 20, 21 and 22. The leg members 20, 21 and 22 are adapted to coact together in abutting end-to-end relationship to form the triangular assembly 16. Each leg member 20, 21 and 22 has an outside perimeter portion 23, 24 and 25, respectively, which is thickened relative to the adjacent inside perimeter portion 26, 27 and 28, respectively, of each leg 20, 21 and 22. The general constructional arrangement of legs 20, 21 and 22 of the triangular assembly 16 in a warning device 15 has been established by governmental agencies; see, for example, Motor Vehicle Safety Standard No. 125.

Thus, according to this Standard No. 125, for example, the outside perimeter portion 23, 24 and 25 of leg members 20, 21 and 22, respectively, has an outer border of red reflex reflective material of uniform width which is not less than 0.75 nor more than 1.75 inches wide, and the inside perimeter portion 26, 27 and 28 of leg members 20, 21, and 22, respectively, has an inner border of orange fluorescent material of uniform width not less than 1.25 nor more than 1.30 inches wide. Furthermore, by this same Standard No. 125, each vertex of the triangular assembly 16 has a radius of not less than 0.25 inches and not more than 0.50 inches. All edges of triangular assembly 16 are rounded or chamfered, as desirable, to reduce the possibility of cutting or harm to the user. Each of the leg members 20, 21 and 22 of a device 15 by this Standard No. 125 is not less than 17 and not more than 22 inches in length, and is not less than 2 nor more than 3 inches in width. A triangular assembly 16 is in the form of an equilateral trilateral that stands in a plane not more than 10° from the vertical with the lower edge of the base (here leg member 21) of the triangular assembly 16 being horizontal and not less than 1 inch above the ground. The color of the red reflective material on a device 15 is defined, as is the color of the orange fluorescent material. Reflectivity and luminescence are specified.

In addition, by this Standard No. 125, device 15 must be capable, when erected in a configuration generally as shown in FIG. 1, of resisting the force of a horizontal wind of 40 miles per hour in any direction for 3 minutes. Furthermore, such a device 15 must be capable of passing through an environmental conditioning sequence involving extreme temperature and humidity conditions.

The construction of the present invention when incorporated into a device 15 readily permits one, if desired, to produce a device 15 which will pass and meet all of such specifications as set forth in the aforeindicated Standard No. 125. Details concerning color, particular materials of construction, or the like, as respects a particular individual embodiment of the present invention, are left to the wishes of a user, so far as the present invention is concerned, although it is naturally preferred to fabricate any embodiment of this invention of the finest quality material available. Plastic materials are preferred for such fabrication.

In the device 15, each leg member 20, 21 and 22 is herein constructed in the manner taught by the present invention. Construction of leg member 20 will now be explained as being representative. Referring to FIGS. 3 and 4, it will be appreciated that a construction of the present invention utilizes a closed loop of material, which is herein designated in its entirety by the numeral 31. Suitable materials of construction for the loop 31 and portions integral therewith include a polyvinyl chloride, vinyl chloride/vinyl acetate copolymers, a rubber modified polystyrene, a rubber modified polyacrylate, or the like, as those skilled in the art will readily appreciate. Loop 31 has elongated side wall portions 32 and 33 which are in spaced, generally parallel relationship to each other. In addition, loop 31 has shortened, relative to the side wall portions 32 and 33, opposite end wall portions 34 and 35, which interconnect the side wall portions 32 and 33.

Throughout, loop 31 has a generally cross sectionally H-shaped configuration wherein the inner side and end wall portions 36 of loop 31 are shorter in height than the adjacent interconnected (the interconnection being through bridge 37) outer side and end wall portions 38 thereof. A flange 39 is integral with an outer side wall portion 38 and projects laterally outwardly therefrom; flange 39 in a finished leg 20 becomes inside perimeter portion 26.

A pair of plates 41 and 42 are provided. Here, each plate 41 and 42 is molded with a reflex reflective outside surface portion generally designated 43 and 44, respectively, and each plate 41 and 42 has an inside face generally designated 46 and 47, respectively. Preferably, inside face 46 is a mirror image of inside face 47.

The inside face 46 or 47 of each plate 41 or 42, respectively, has a channel 48 and 49, respectively, formed therein. Channels 48 and 49 are each defined by an inner shoulder 51 and 52, respectively. and by an outer shoulder 53 and 54, respectively. The channels 48 and 49, respectively each extend in spaced relationship to the side edges of each plate 41 and 42, respectively, along the outer perimeter thereof.

Each one of the plates 41 and 42 is elongated and is adapted to have its inside face 46 and 47, respectively, fit in mating engagement over one lateral side of loop 31 with the chanels 48 and 49, respectively, being adapted to receive a different, opposed outer edge region of the inner wall portion 36 of the loop 31. Simultaneously, the outer shoulder 51 and 52 of each plate 41 and 42, respectively, is adapted to lie adjacent the inside faces of the outer wall portion 38 of the loop 31.

Each inner shoulder 51 and 52, respectively, of the plates 41 and 42, projects laterally and normally away from its inside face 46 and 47, respectively, to an extent such that the outer end of each shoulder 51 and 52, respectively, is adapted to lie in adjacent, preferably abutting, relationship with the corresponding outer end of the other such shoulder 51 and 52, respectively, when the plates 41 and 42, respectively, are each in such mating engagement with the loop 31.

The abutting ends of shoulders 51 and 52 are bonded together by some convenient means, such as an adhesive, sonic welding (presently preferred), or the like, which may be continuous or discontinuous between the abutting shoulders 51 and 52 as desired or convenient. Illustrated, for example, in FIG. 5 is a sonic welding operation in the course of which the abutting shoulder ends of shoulder 51 and 52 are periodically welded together using a sonic welding device 55. Conveniently tabs 56 and 57 are provided on each outside face 43 and 44, respectively, of plates 41 and 42, to facilitate a sonic welding operation.

In the triangular assembly 16 of device 15 (see FIG. 6), the upper end of inner perimeter portion 26 rests in a pocket portion 60 formed in the upper end of inner perimeter member 28 thereby to interlock leg 20 with leg 22. A pin (not shown) may be provided for extension through aligned holes 61 in assembled, engaged perimeter portions 26 and 28.

To disassemble triangular assembly 16, the leg is simply moved upwardly to disengage leg 21 from leg 22. Then, leg 20 is revolvably moved about the pintel portion of a hinge member (not shown) in a direction moving initially inwardly as respects the paper on which FIG. 1 appears, then downwardly, until the leg member 20 has revolved into a position which is in side-by-side relationship to the leg member 21. Similarly, the leg member 22 is moved in a direction initially outwardly as respects the paper on which FIG. 1 appears, then downwardly, until the leg member 22 has revolved about the pintle portion of a hinge 62 into a position which is in side-by-side relationship to the leg member 21 but on the opposed side of leg 21 as respects that on which leg member 20 lies. In this configuration, the triangular assembly 16 may be considered to be in a disassembled condition.

The triangular assembly 16 engages pedestal 17 by means of the pivot means or swivel 18, the swivel 18 being revolvable in the pedestal 17.

As may be appreciated by reference to FIG. 6, in order to provide a thickened outside perimeter 23, 24 and 25 in a triangular assembly 16 which continuously circumscribes such triangular assembly 16, the inside perimeter portion 26, 27 and 28 of each respective leg 20, 21 and 22 is shortened relative to its associated respective outside perimeter portion 23, 24 and 25. Thus, perimeter portion 23 of leg member 20 projects longitudinally beyond the termination of the inside perimeter portion 26 at one end of leg member 20 so that the inside end of the outside perimeter portion 23 lies against the end portion of the outside perimeter portion 25 of leg member 22, while the inside perimeter portion 28 of leg member 22 abuts in a symmetrical manner against the inside perimeter portion 26 of leg member 20. A similar arrangement is used in each of the other two corners of a triangular assembly 16.

Shown in FIGS. 7 and 8 is an embodiment of constructions of the present invention combined to form a four sided display device, which is designated in its entirety by the numeral 70. Device 70 may be regarded as incorporating four constructions of the present invention, as those skilled in the art well appreciate, because four closed loops comprise a frame means for device 70, each loop being designated by the numbers 71, 72, 73 and 74, respectively. Conveniently, the frame means for device 70 is formed in a single molding operation wherein abutting end wall portions of the individual loops 71, 72, 73 and 74 are integrally joined to one another at 45° angles using common walls. A flange 76 continuously projects laterally inwardly and sidewards from the edge of inside side wall members comprising each loop; 71, 72, 73 and 74. In each opposed side of each loop 71, 72, 73 and 74 are mounted, in the same manner as earlier described in reference to the plates 41 and 42 in FIGS. 3, 4 and 5, reflex reflective plate pairs 77, 78, 79 and 80. Mounted across the rectangular area defined within inside wall members of loops 71, 72, 73 and 74 is a pair of facially opposed panels 83 and 82, each such panel being conveniently retained in place over opposed faces of flange 76 by means of the detents 84 and 85 (see FIG. 8) which circumferentially extend around the inside wall members of each loop 71, 72, 73 and 74. The panels 82 and 83 each provide a flattened outside surface upon which information can be painted, mounted, or the like, as desired by a user, as will be readily understood by those skilled in the art. Panels 82 and 83 can be formed of luminous material, fluorescent material, or the like, if desired.

An alternative construction for such a device 70 is illustrated in FIG. 9. Here, in the initial molding operation wherein the loops 71',72',73' and 74' are formed, a continuous surface 76A is formed by expanding laterally the flange 76 of device 70 so that a continuous surface is provided across the rectangular area enclosed by the individual loops 71',72',73' and 74'.

Another alternative embodiment of such a device 70 is shown in FIG. 10 wherein two pairs of H-shaped loop configurations 81A and 81B respectively are formed in adjacent abutting relationship to one another about the inside of each loop, such as 74'', there being a common wall formed by inner, adjacent wall portion of each loop of the adjacent pair during the formative molding operation. Thereafter, a pair of separately molded plates 76B and 76C, each plate 76B and 76C having a perimetric channel on its inner face and being the mirror image of the other, are engaged over the inner channel of the inner H-configuration adjacent each loop 71, 72, 73 and 74 in the same manner, if desired, as earlier described in reference to the plates 41 and 42 in FIGS. 3, 4 and 5. Here, the relex reflector plates of device 70 are replaced by plates 80A and 80B which are formed with non-reflective surfaces, such as a material of luminous properties, or the like.

Preferably, when a construction of this invention is used to form a display device or the like, the plates received with the loops are reflex reflectors. Also, preferably in such a construction, the loop is composed or comprised of fluorescent material. One preferred device utilizing a construction of this invention is a triangular assembly intended for use as a warning device and is as generally illustrated in FIGS. 1 and 2 herein, which triangular assembly uses the three independent loop constructions in abutting end-to-end relationship.

Alternatively, such a triangular assembly can preferably be formed utilizing three integral loop members, wherein opposite end wall portions of each of the loops are in adjoining end-to-end relationship and wherein the flanges are at least partially integrally interconnected together.

Another preferred device made using a construction of the present invention comprises a quadrilateral assembly using four independent loop constructions in abutting end-to-end relationship. A preferred such quadrilateral assembly has an integral construction wherein the opposite end wall portions of each of the loops are in adjoining end-to-end relationship and wherein the flanges are at least partially interconnected. Such a device is shown, for example, in the FIGS. 7 and 8, see also FIGS. 9 and 10.

Another type of preferred construction of the present invention is shown in FIGS. 11 through 19 where a single loop of generally H-shaped section is used as a frame member about a pair of aligned, opposed reflector bodies. For example, in FIG. 11 there is shown a frame member 85 having an H-shaped section in which the inner legs of the H are generally shorter than the outer legs. A pair of reflex reflectors 86A and 86B, each having a channel 88 formed about the perimeter of the inside face thereof are employed. Each channel 88 is defined by an outer shoulder 89, which constitutes a downturned flange about the outside edge of a reflector 86A or 86B and which defines the outer wall of the channel 88, and by an inner flange 90 which upstands from the inner face of each member 86A and 86B and which is in spaced, parallel relationship to the flange or shoulder 89 thereby to define the inner wall of the channel 88. The flange 90 is characteristically slightly higher than the flange 89, the exact height thereof being approximately one half the thickness of the cross bar member joining the respective leg members comprising the H-shaped section of the loop 85; thus, the edges 91 of the inner flange 90 of each respective reflector body 86A and 86B abut when the reflector bodies 86A and 86B are both matingly engaged within and around a flange member 85. When a bead, typically about 0.015 inch thick is produced on edges 91 the bodies 86A and 86B may be sonically welded together without bonding between either body 86A or 86B and frame member or loop 85.

An ear or flange 92 is shown in FIG. 11 laterally outwardly extending from an edge of the loop 85. Ear 92 contains an elongated slot therein for mounting the reflector comprised of loop 85 and reflector bodies 86A and 86B. Opposite the ear 92 on an opposed side edge of the loop 85 another ear (not shown in FIG. 11) may be positioned, as those skilled in the art will appreciate. Ears outwardly extending or other form of fastening means may be positioned as desired on a frame 85, integral with such (preferred), or otherwise.

A display body using a frame or loop member of this invention can have any convenient shape or dimensions. Types of flattened rectangular shapes are illustrated in the embodiment shown in FIGS. 12A and 13, as well as in FIG. 12B. A type of circular construction is illustrated in FIG. 14. Fastening means can be of any desired shape or type, such as the outwardly extending flange members illustrated in FIGS. 12A and 14.

Figure 13:
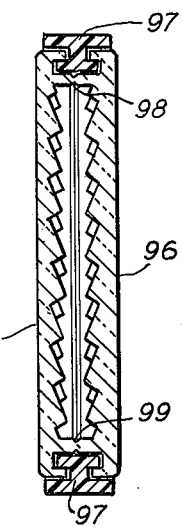
FIG. 13 is a vertical sectional view taken through the device of FIG. 12, part A.
Figures 12A, 12B:
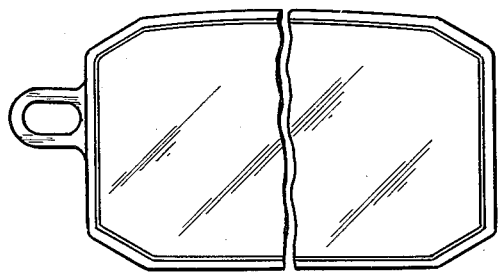
FIG. 12, part A is a side elevational view of a warning device incorporating one embodiment of a construction of the present invention.
Figure 14:
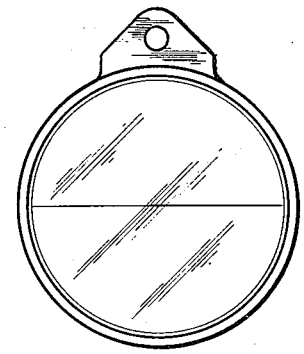
FIG. 14 is a side elevational view of a warning device incorporating one embodiment of a construction of the present invention.

Cross sectionally, the characteristic appearance of a construction such as illustrated in FIGS. 11, 12A, 12B and 14 is generally shown by FIG. 13. The (preferably) reflector bodies 95 and 96 in FIG. 13 matingly engage over and about a loop 97, and the bodies 95 and 96 are secured to one another as by sonic welding or the like at abutting regions, such as 98 and 99 in FIG. 13. The loop 97 is thus held by the bodies 95 and 96 by a clamping action which does not involve a direct bonding in any way of either body 95 or of body 96 to the loop 97.

It is, of course, not necessary to have a pair of matching plate members set in a given frame member. Thus, for example, in FIG. 15 a reflector construction is shown wherein a transparent reflector body 101 is bonded to an opaque backing member 102 using a frame member 103 having a characteristic generally H-shaped section.

Figures 15, 16, 18:
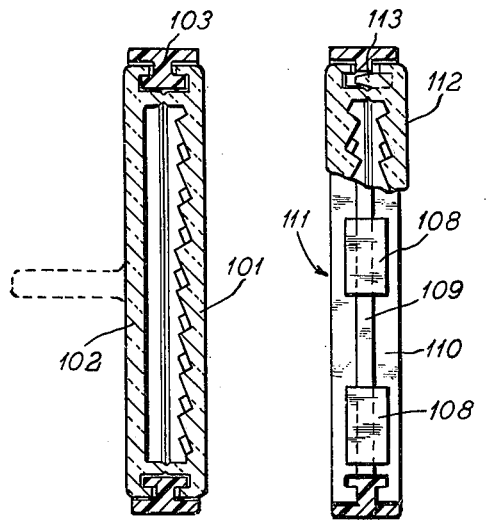
FIG. 15 is a vertical sectional view taken through the device of FIG. 12, part B, but showing an alternative embodiment thereof.
FIG. 16 is a view similar to FIG. 15 but showing another alternative embodiment thereof.
FIG. 18 is a view similar to FIG. 15 but showing yet another alternative embodiment thereof.
Figure 19:
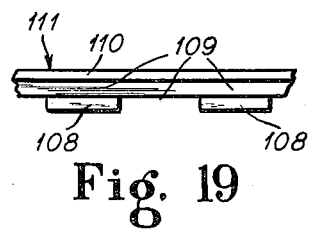
FIG. 19 is a fragmentary side elevational view of a portion of the loop member employed in the device of FIG. 18.
Figure 17:
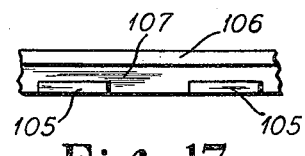
FIG. 17 is a fragmentary side elevational view of a portion of the loop member employed in the device of FIG. 16.

It is not necessary to have the inside and outside vertical walls of a frame member of this invention have continuous extension. Thus, for example, either the inner or the outer vertical members may be periodically interrupted, and/or a portion of the transverse wall member interconnecting the vertical wall members together may be interrupted. FIGS. 16 and 17 illustrate an embodiment wherein the inner vertical wall member 105 is periodicaly interrupted leaving the outside vertical wall member 106 continuous and the transverse wall member 107 intact and continuous. Figures 18 and 19 illustrate an embodiment wherein the inner vertical wall member 108 is periodically interrupted along with the adjoining portion of the transverse wall member 109 but leaving the outside vertical wall member 110 intact. This latter arrangement permits a body mounted in such a frame member 111, such as a molded reflex reflector body 112, to be equipped with an alignment tab 113, if desired, which is positioned and adapted to extend through such discontinuity defined by the interruption of the wall members 108 and 109.

A closed loop of material employed in a construction of this invention, as can be seen from the preceding description, is generally of a one-piece construction and is characterized by having an H-shape cross-sectionally, by having a spatial configuration wherein the side walls thereof are generally vertically oriented relative to the adjacent domain enclosed by such loop, and by having the side walls in spaced parallel relationship to one another and interconnected by an end or transversely extending wall. The inner and outer side walls can be of any convenient configuration but are most preferably uninterrupted about the respective perimeters thereof. Preferably the outside and inside side walls are symmetrical with respect to an end wall interconnecting same with each other, and the respective side walls have uniform heights above and below the interconnecting end wall. Preferably the inside wall has an overall height which is shorter than the adjacent end wall interconncted outer side wall. Preferably a closed loop of material is in a flattened configuration.

Other and further embodiments and variations of the present invention will become apparent to those skilled in the art from a reading of the present specification taken together with the drawings, and no undue limitations are to be inferred or implied from the present disclosure.

The claims are:

1. A construction for a display device, reflector, or the like comprising:

A. a closed loop of material comprising a pair of spaced, parallelly extending wall members which are interconnected together generally across their respective adjacent midregions by a connecting rib, one said wall member formed so as to be continuously oriented in said loop inwardly relative to the other such wall member, said wall members being generally vertically oriented relative to said rib, said rib generally transversely extending in said loop, each wall member having opposed vertically extending spaced edge portions with the inward wall member shorter in length than the other wall member B. a pair of plate-like members with each plate-like member adapted to have display, reflector, elements and the like incorporated therein, each said plate-like member having an outside face and an inside face, each inside face having a channel defined therein adjacent the perimeter thereof, each said plate-like member being adapted to fit in mating engagement over a different one of the opposed edge portions of said inwardly oriented wall member of said closed loop with said channel thereof receiving said edge portions and with the perimeter portion near to portions of said other wall member, each said plate-like member furthr having upstanding shoulder portions circumferentially projecting about inside edge portions of said channel from said inside face, said respective shoulder portions of each plate-like member being adated to abut against one another for bonding when said plate-like members are each so matingly engaged over said opposed edge portions.

2. The construction of claim 1 wherein said plate-like members are bonded together as so engaged over said loop by bonding means between said abutting shoulder portions.

3. The construction of claim 2 wherein said loop and said plate-like members are each formed of plastic and said bonding means comprises sonic welding.

4. The construction of claim 1 wherein a flange means projects laterally outwardly from a portion of said other wall member.

5. The construction of claim 1 wherein the inner surface of one of said plate-like members is a reflex reflector.

6. The construction of claim 1 wherein the inner surface of each of said plate-like members is a reflex reflector.

7. A construction adapted for incorporation into a display device or the like comprising:
A. a closed loop of material, said loop having outer and inner vertically oriented wall portions in spaced, parallel relationship to one another and joined together by an end wall symetrically so as to provide cross-sectionally an H-shape wherein opposed edges of the inner wall portions of said loop are generally shorter in height than opposed edges of the outer wall portions thereof,
B. a flange projecting lateraly outwardly from areas of said outer wall portions,
C. a pair of plates adapted to have display devices and the like incorporated therein
  1. each one of said plates having an outside face and an inside face,
  2. the inside face of each one of said plates having a channel formed therein and defined by an inner shoulder and an outer shoulder, said channel extending in spaced relationship to the side edges of such plate along the outer perimeter thereof,
  3. each one of said plates being adapted to have its said inside face fit in mating engagement over one lateral side of said loop with said channel of each plate receiving a different one of the opposed edges of said inner wall portions and with said outer perimeter of each plate being adjacent said outer wall portions,
  4. said inner shoulder in each one of said plates thereof projecting laterally and normally away from said inside face thereof to an extent such that the end of said inner shoulder is adapted to be in adjacent, abutting relationship to the corresponding end of the other shoulder of the other of said plates when each of said plates is in mating engagement with said loop, and
D. means bonding said abutting shoulder ends together.

8. A construction of claim 7 wherein the inner surface of said plates are each a reflex reflector.

9. A construction of claim 7 wherein said flange is comprised of fluorescent material.

10. A triangular assembly utilizing three independent constructions of claim 7 in abutting end-to-end relationship.

11. A quadrilateral assembly utilizing four independent constructions of claim 7 in abutting end-to-end relationship.

12. A triangular assembly utilizing three integral constructions of claim 7 wherein opposite end wall portions of each of said loops are in adjoining end-to-end relationship and wherein said flanges at least partially integrally interconnect.

13. A quadrilateral assembly utilizing four integral constructions of claim 7 wherein opposite end wall portions of each of said loops are in adjoining end-to-end relationship and wherein said flanges at least partially interconnect.

14. A construction of claim 7 wherein said bonding means comprises sonic welding.

15. A construction of claim 14 wherein said plates are reflex reflectors and said flange is comprised of fluorescent material.

* * * * *